United States Patent
Reinhard et al.

(10) Patent No.: US 7,637,287 B2
(45) Date of Patent: Dec. 29, 2009

(54) ANTI-BUCKLING DEVICE FOR THIN-WALLED FLUID DUCTS

(75) Inventors: Andreas Reinhard, Zurich (CH); Wendelin Egli, Seuzach (CH); Dirk Schmieding, Ellerbek (DE)

(73) Assignee: LSS Life Support Systems AG, Glattbrugg (CH)

( * ) Notice: Subject to any disclaimer, the term of this patent is extended or adjusted under 35 U.S.C. 154(b) by 0 days.

(21) Appl. No.: 10/543,082

(22) PCT Filed: Nov. 11, 2003

(86) PCT No.: PCT/CH03/00734

§ 371 (c)(1),
(2), (4) Date: Mar. 3, 2006

(87) PCT Pub. No.: WO2004/068019

PCT Pub. Date: Aug. 12, 2004

(65) Prior Publication Data

US 2006/0151039 A1 Jul. 13, 2006

(30) Foreign Application Priority Data

Jan. 27, 2003 (CH) .................................. 0109/03

(51) Int. Cl.
*F16L 11/00* (2006.01)
(52) U.S. Cl. .................. 138/108; 138/110; 138/112
(58) Field of Classification Search ................ 138/110, 138/128, 108, 112
See application file for complete search history.

(56) References Cited

U.S. PATENT DOCUMENTS

| | | | | |
|---|---|---|---|---|
| 395,584 A | * | 1/1889 | Phipps ........................ 138/111 |
| 1,928,992 A | * | 10/1933 | Clark et al. ................... 138/103 |
| 3,294,122 A | * | 12/1966 | Sharp .......................... 138/110 |
| 3,720,235 A | * | 3/1973 | Schrock ....................... 138/137 |
| 3,770,022 A | * | 11/1973 | Beisemann ................... 138/108 |
| 3,974,862 A | | 8/1976 | Fuhrmann |
| 4,131,399 A | * | 12/1978 | Calvet ..................... 417/477.12 |
| 4,163,474 A | | 8/1979 | MacDonald et al. |
| 4,352,378 A | * | 10/1982 | Bergmann et al. ............. 138/38 |
| 4,398,910 A | * | 8/1983 | Blake et al. .................. 604/266 |
| 4,420,016 A | * | 12/1983 | Nichols ........................ 138/103 |
| 4,452,279 A | * | 6/1984 | Atwell ......................... 138/126 |
| 4,456,058 A | * | 6/1984 | Powell ......................... 165/154 |

(Continued)

FOREIGN PATENT DOCUMENTS

EP 0983190 3/2000

(Continued)

*Primary Examiner*—James F Hook
(74) *Attorney, Agent, or Firm*—Winstead PC

(57) ABSTRACT

Disclosed is an anti-buckling device (1) which is made of an elastic material and comprises several ribs (2) that extend in the longitudinal direction thereof, the space between two ribs (2) forming a groove (3). The anti-buckling device (1) is inserted into a thin-walled duct. The anti-buckling device (1) prevents the duct from buckling and thus from being occluded in a bend when said duct is bent. A fluid is able to circulate within the duct and bypass the bend in the grooves (3) of the anti-buckling device (1). The envelope of the cross section of the anti-buckling device is essentially lenticular as a duct having a round cross section also becomes lenticular in a bend.

20 Claims, 6 Drawing Sheets

U.S. PATENT DOCUMENTS

| | | | |
|---|---|---|---|
| 4,529,009 A * | 7/1985 | Horner et al. | 138/111 |
| 4,579,555 A * | 4/1986 | Russo | 604/541 |
| 4,602,763 A * | 7/1986 | Gaylin | 254/134.3 FT |
| 4,804,020 A * | 2/1989 | Bartholomew | 138/111 |
| 4,807,962 A * | 2/1989 | Arroyo et al. | 385/105 |
| 4,821,354 A * | 4/1989 | Little | 5/422 |
| 5,011,332 A * | 4/1991 | Kunze et al. | 405/158 |
| 5,018,260 A * | 5/1991 | Ziu | 24/555 |
| 5,307,803 A * | 5/1994 | Matsuura et al. | 600/140 |
| 5,803,127 A | 9/1998 | Rains | |
| 6,167,883 B1 * | 1/2001 | Beran et al. | 128/203.17 |
| 6,239,363 B1 * | 5/2001 | Wooters | 174/47 |
| 6,283,159 B1 * | 9/2001 | Tada | 138/116 |
| 6,478,789 B1 * | 11/2002 | Spehalski et al. | 604/540 |
| 6,604,549 B2 * | 8/2003 | Gauthier et al. | 138/108 |
| 6,796,743 B2 * | 9/2004 | Nothofer et al. | 405/183.5 |
| 6,866,657 B2 * | 3/2005 | Shchervinsky | 604/266 |
| 2005/0115622 A1 * | 6/2005 | Bennett et al. | 138/119 |
| 2006/0016500 A1 * | 1/2006 | Berry, Jr. | 138/112 |

FOREIGN PATENT DOCUMENTS

WO     WO 01/14782     3/2005

* cited by examiner

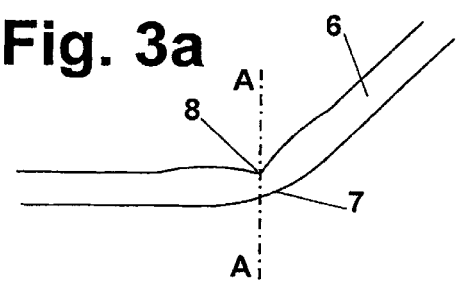
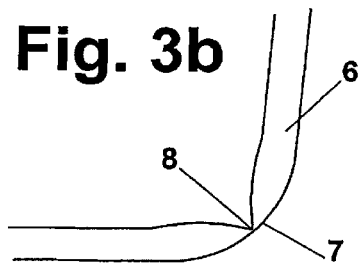
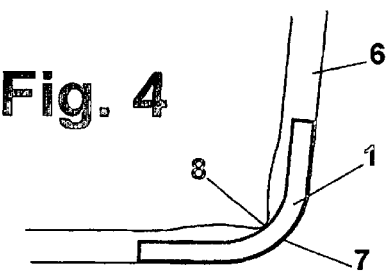
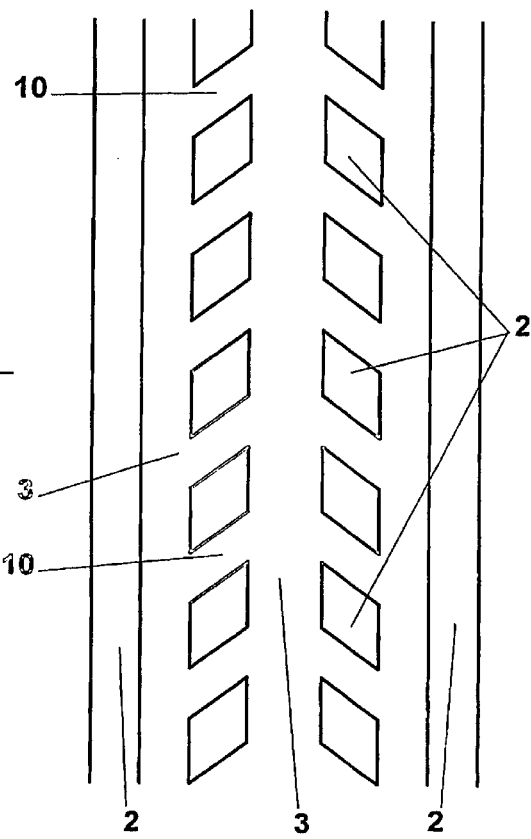
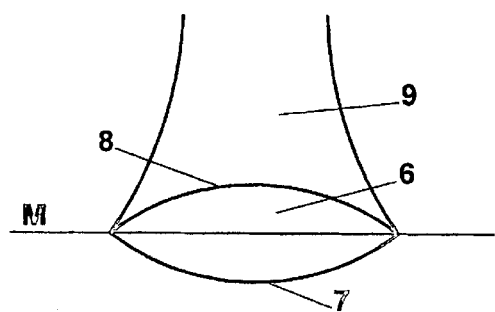
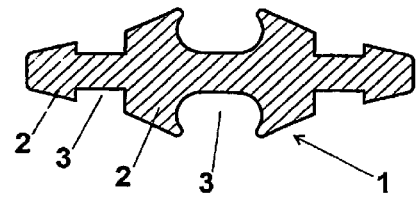

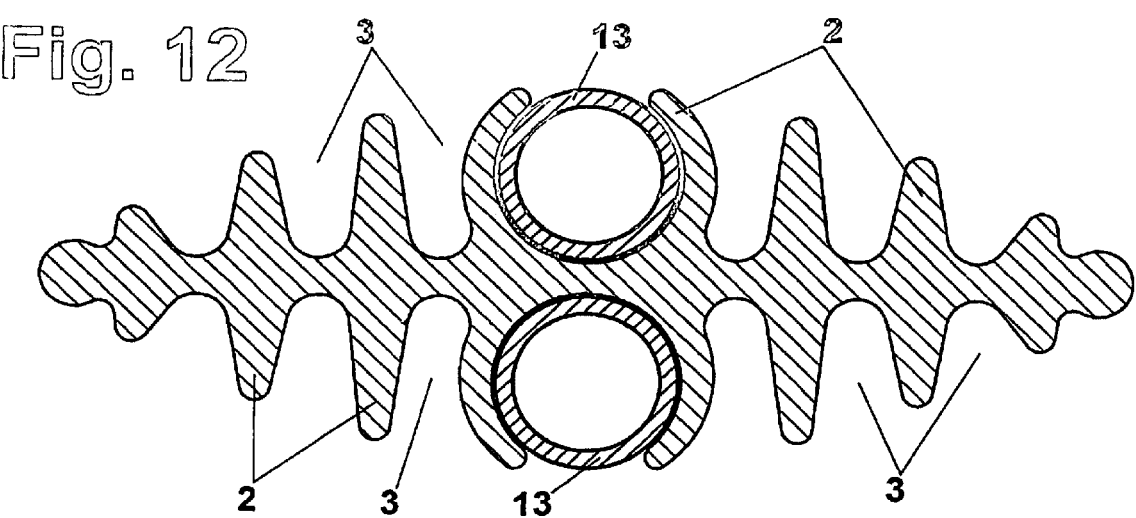

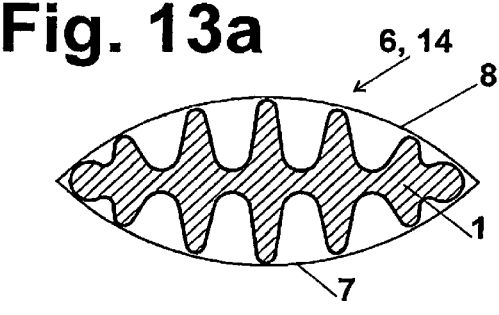
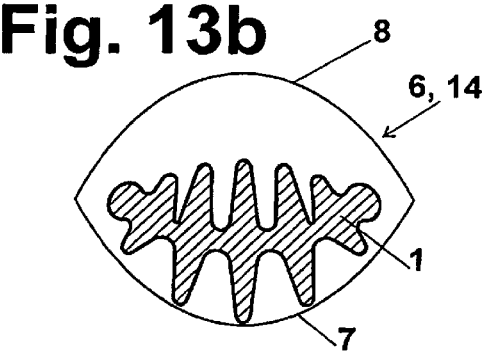
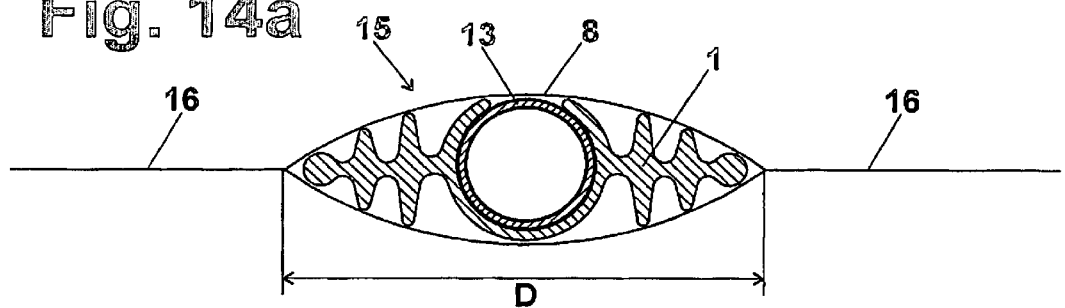
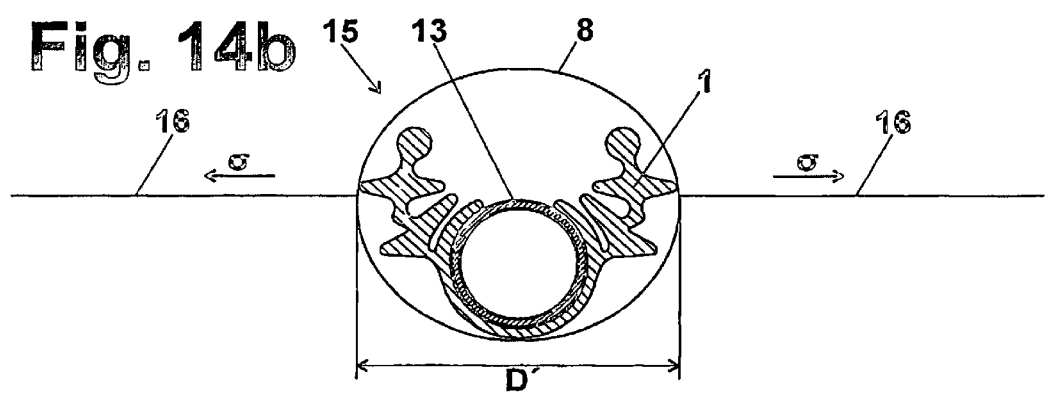

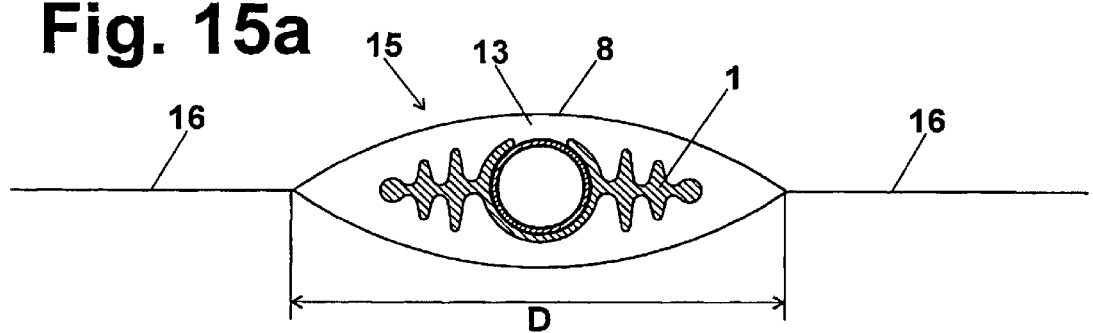
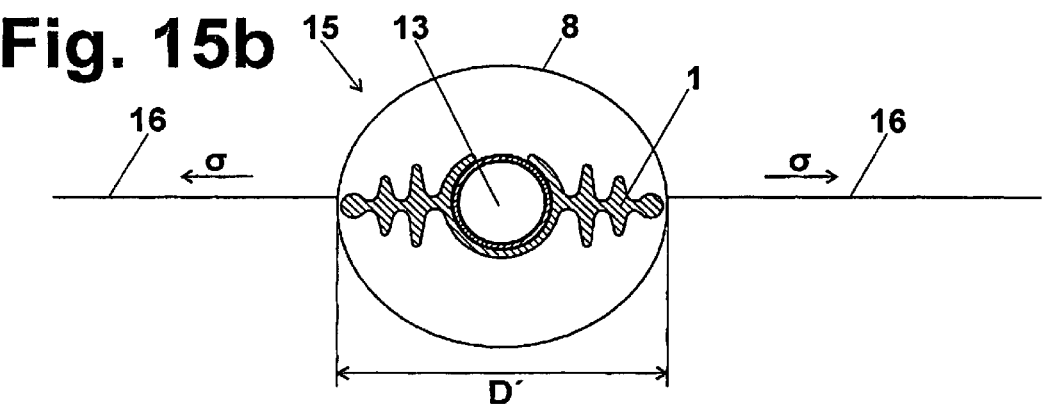

ANTI-BUCKLING DEVICE FOR THIN-WALLED FLUID DUCTS

The present invention relates to an anti-buckling device for thin-walled fluid ducts in accordance with the introductory section of claim 1.

Most closely related to the anti-buckling device in accordance with the invention is WO 01/14782 (D1). Document D1 discloses a self-adjusting segmented opening of a pipe or duct. From both sides webs are recessed asymmetrically in a pipe perpendicularly to the direction of flow. Chambers are produced in which vortices can form. The vortices influence the hydro- or aerodynamic characteristics of the pipe. For example, the mass throughflow through a pipe can be regulated. Depending on the configuration minimum and/or maximum mass flows can be set.

However, the invention disclosed in (D1) cannot guarantee a minimum throughflow if pipes or hoses are bent and buckling occurs. The webs on the internal walls even increase the tendency of a pipe to become occluded in such cases.

The present invention is intended to prevent thin-walled fluid ducts becoming buckled or constricted in tight radii, and the throughflow being impeded or even interrupted.

Figure 1:
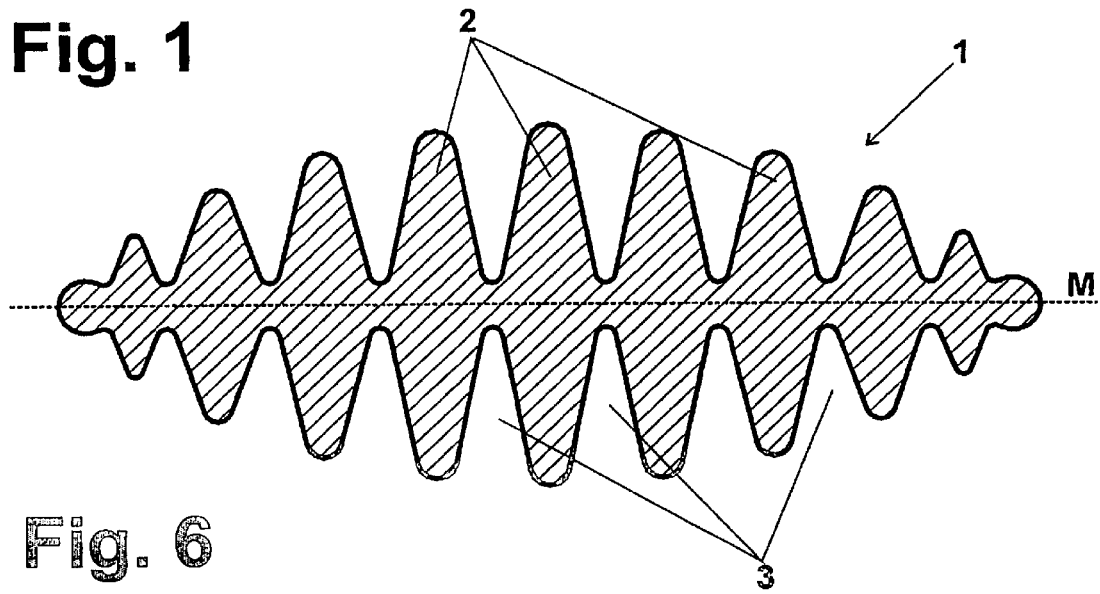

FIG. 1 shows a cross-section through a first example of embodiment

Figure 6:
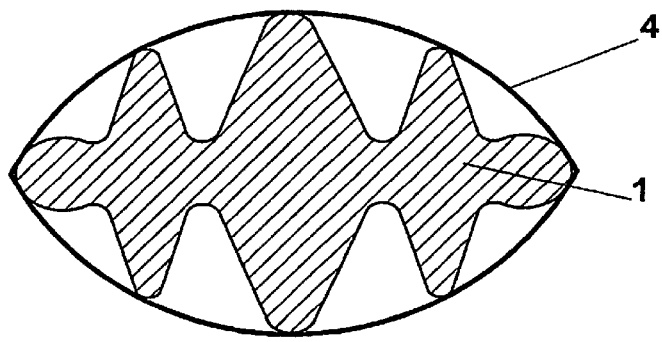
Figure 7:
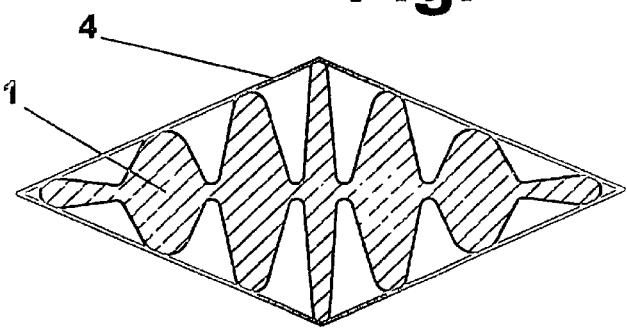
Figure 8:
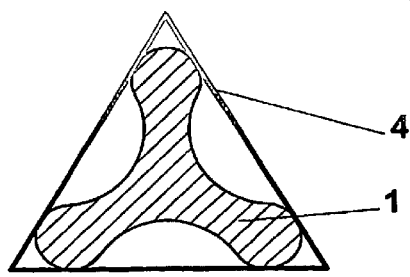
Figure 2A:
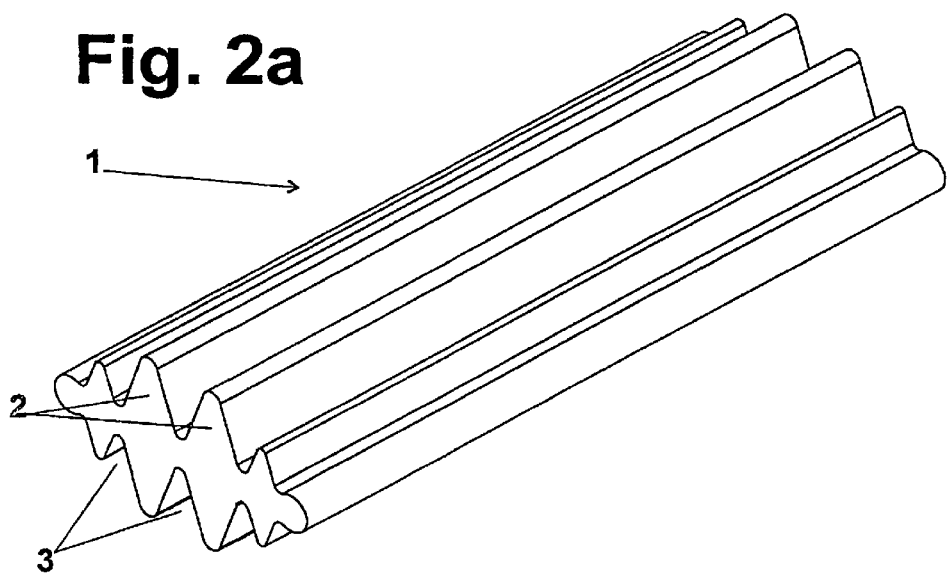
Figure 10:
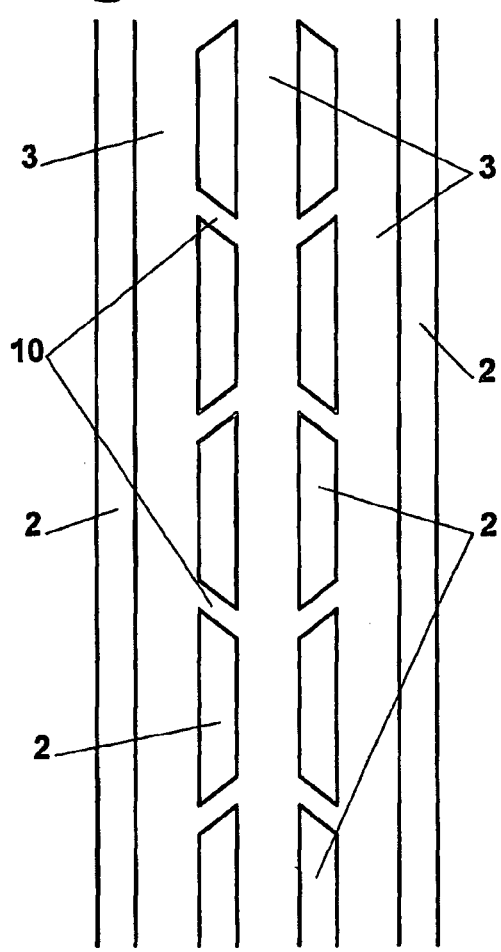
Figure 11:
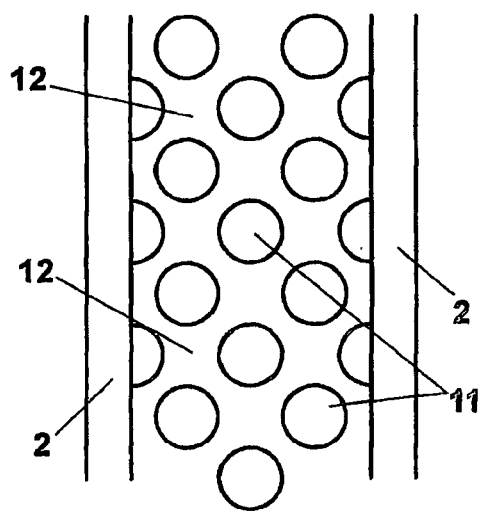
Figure 12:
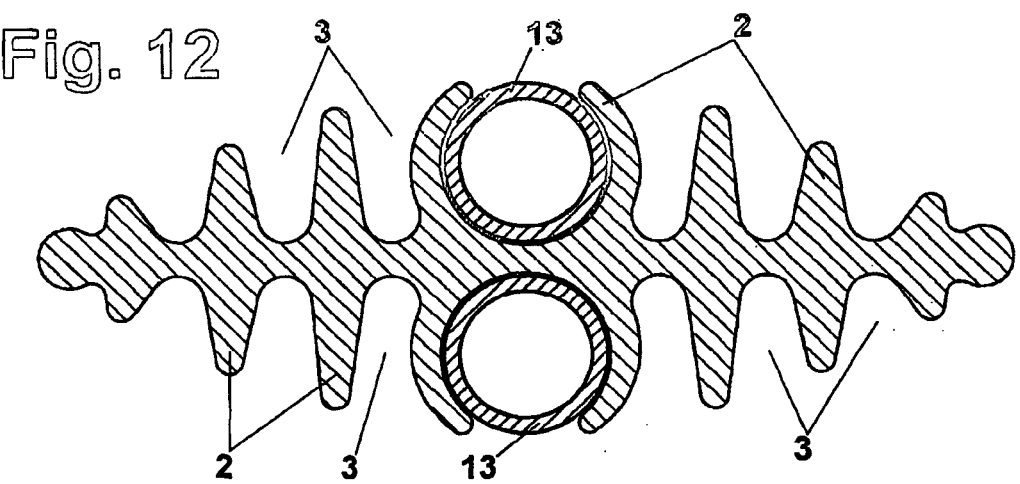

FIGS. 2a, b isometrically show a first example of embodiment in a elongated and bent condition FIGS. 3a, b show a longitudinal section through a duct with different bends FIG. 4 shows a cross-section through a strongly bent duct with an inserted anti-buckling device FIG. 5 shows a front view of a buckling point FIGS. 6-8 various envelopes with different cross-sections of the first example of embodiment FIGS. 9a, b show a cross-section and a top view of a second example of embodiment FIGS. 10, 11 show two variants of the top view of the second example of embodiment FIG. 12 shows a cross-section through a third example of embodiment FIGS. 13a, b show cross-sections through a hose with a first example of embodiment FIGS. 14a, b show cross-sections through a core with a third example of embodiment FIGS. 15a, b show cross-section through core with a variant of a third example of embodiment FIG. 1 shows a cross-section through an anti-buckling device 1 according to the invention. It is shaped in such a way that on both sides of a middle line M several ribs 2 are present. Between every two ribs 2 grooves 3 are thus formed.

The isometric view of the anti-buckling device 1 in FIG. 2a shows this in an elongated, straight and thus non-functional form. The ribs 2 run parallel to each other along the entire length of the anti-buckling device 1. The grooves 3 can be seen between the ribs 2.

Figure 2B:
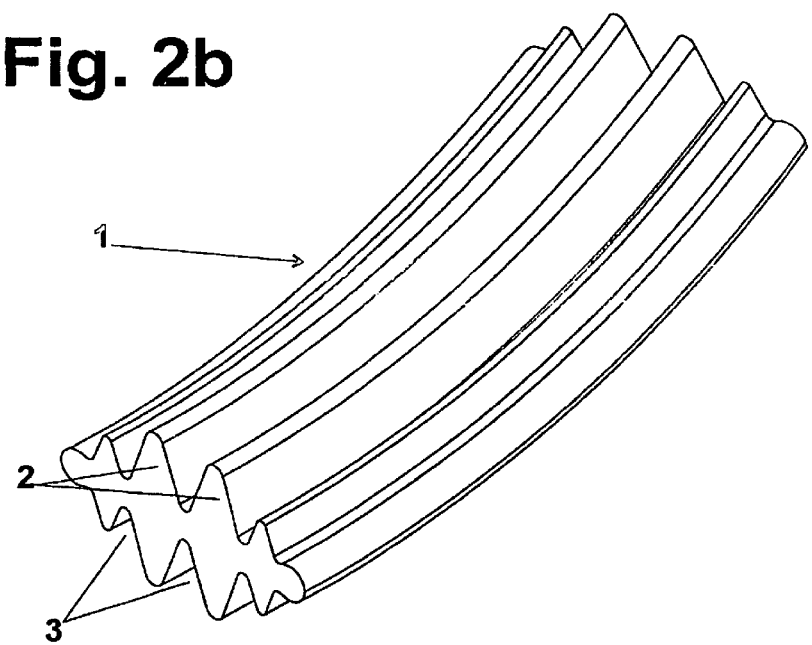

A bent, functioning form of the anti-buckling device 1 is shown in FIG. 2b. Here the ribs 2 and grooves 3 run in parallel to each other. In order to keep deformation of the cross-section to a minimum the anti-buckling device 1 is made of an elastic material, for example an elastomer, with a hardness of between 30 and 80 Shore.

When the anti-buckling device 1 is bent, one side is always elongated and the opposite side is always compressed. The elastomer is able to permit this deformation without buckling and essentially changing its cross-section; this means that the ribs 2 and groove 3 continue to be present when the anti-buckling device 1 is bent.

FIGS. 3a, b show longitudinal sections through a thin-walled duct 6 at various bending radii. In the area of the bend an elongation zone 7 occurs, with a buckling point 8 opposite it. In a strongly bent duct 6—as shown in FIG. 3b—a point can be reached at which the buckling point 8 is so compressed that it comes into contact with the elongation zone 7 thereby occluding the duct 6.

In FIG. 4 an anti-buckling device 1 is inserted into a strongly bent duct 6. The buckling point 8 can now no longer reach the elongation zone 7 and the duct 6 remains open for fluids. In order to prevent buckling before and after the anti-buckling device 1 it is expedient to select the length of the anti-buckling device 1 to be approximately equal to the length of the elongation zone 7. FIG. 5 shows a section AA in FIG. 3a. The cross-section of an essentially circular duct 6 is essentially lenticular at the buckling point 8. This shape is produced by the interaction of pressure and tensile forces in the duct bend. The elongation zone 7 is produced by tensile forces in the outer radius of the duct bend and is pulled towards the midline M, while the buckling point 8 is produced by pressure forces in the inner radius and is pressed towards the midline M. The diameter orthogonal to the midline M is thereby reduced and that along the midline M enlarged.

In both directions away from the buckling points 8 the duct 6 continuously reassumes its original cross-section, for example a circular cross-section. The inventive concept therefore includes constantly varying the envelope 4 of the anti-buckling device 1 matching it to the cross-section of the duct 5, for example from a circular to a lenticular form.

FIGS. 6, 7 and 8 show various cross sections of anti-buckling devices 1 with their corresponding envelopes. With their lenticular or rhomboid shape the envelopes 4 in FIGS. 6 and 7 take into account the cross-section at the buckling point 8 described in FIG. 5. Other envelopes 4, such as in FIG. 8 with, for example, triple rotational symmetry are also of course considered to be in accordance with the invention. In general the envelopes 4 can be built up of polygonal and/or curved segments which occur by connecting adjacent ribs 2. Accordingly the shape and arrangement of the ribs 4 can be freely selected. Essential to the inventive concept is that the grooves 3 remove open and permeable when the anti-buckling device 1 is bent.

FIG. 9a shows a cross-section through a second example of embodiment of an anti-buckling device 1. The ribs 2 and grooves 3 are comparatively broader and the ribs 2 are not as high, with the grooves 3 being less deep accordingly.

The top view of 9b show that this form of embodiment allows the ribs 2 to be interrupted and thereby create transverse connections 9. The transverse connections 9 are useful in two respects. On the one hand the ribs 2 are exposed to less pressure and tension during strong bending, and on the other hand they support regular fluid throughflow as they connect grooves 3 to each other and fluid can flow around occlusions in individual grooves in the area of a bend.

FIG. 10 is a variant of FIG. 9b. The transverse connections 10 are arranged in such a way that both throughflow directions essentially exhibit the same flow conditions in the anti-buckling device.

FIG. 11 shows a further variant. The ribs 2, which are not at the edge of the anti-buckling device 1 are reduced to knobs 11. In place of the grooves 3 and transverse connections 10 there is an intermediate space 12 in which a fluid can flow around the knobs 11. As a further variant it is possible to apply the knobs 11, for example by way of screen printing, to the inside of the duct wall 9. Ribs can of course also be created using the same method.

The cross-section through a third example of embodiment is shown in FIG. 12. The two middle ribs are shaped so that they can hold at least one plastic pipe 13. The wall thickness of the plastic pipe 13 is dimensioned in such a way that the maximum pressure and tension forces which can arise during bending of a duct 6 cannot essentially affect the cross-section of the plastic pipe. In the case of greater forces reinforced plastic pipes 13 can also be used. By way of this measure a minimum throughflow cross-section for a fluid can be guaranteed. The third example of embodiment is particularly suitable for transmitting a pressure, for example via a fluid column which has bends. In this case large quantities of fluid do not have to flow through the cross-section of the at least one plastic pipe 13. The function consists in the fact that the fluid column is not interrupted and the gravitational pressure it produces is essentially proportional to the height of the column.

FIGS. 13 and 14 show how the anti-buckling device according to the invention functions in thin-walled ducts 6 such as hoses 14 or cores 15, which are made of textile gas or liquid-tight materials, inserted in woven materials FIG. 13a shows the anti-buckling device in a duct 6 or a hose 14 at the buckling point 8. The cross-section is essentially lenticular and a fluid can move through the grooves. At the buckling point 8 the duct wall 9 essentially forms the envelope 4 and does not penetrate into the grooves 3. In the same way the area of the envelope 4 essentially constitutes the minimum cross-section area which a bent thin-walled duct 6 can assume at the buckling point 8 with an inserted anti-buckling device 1.

The cross-section shown in FIG. 13b is to be positioned before and after the buckling point 8. The cross-section is essentially circular and with increasing distance from the buckling point 8 corresponds to the original cross-section of the duct 6 or hose 14. The anti-buckling device 1 with a lenticular cross-section is slightly deformed thereby. Pneumatic aircraft seats (CH 1428/92), for example, can utilise this type of anti-buckling device.

FIGS. 14a, b show cross-sections of a core 15 in a woven material 16. A third example of embodiment with a single plastic pipe 13 is shown as the anti-buckling device. At the buckling point 8 the cross-section, as has already been stated, is essentially lenticular and the duct wall 9 forms the envelope (FIG. 14a). The plastic pipe 13 in turn guarantees a minimum throughflow cross-section in the middle of the anti-buckling device 1.

FIG. 14b also shows a cross-section before and after the buckling point 8. This cross-section is essentially circular, like the one in FIG. 13b. However, as the core 15 is in a woven material 16, and as through shortening of the diameter D in the woven material level to D' stresses a [N/m] are introduced into the woven material, a force is required to achieve the circular cross-section. This force can be produced with an excess pressure ρ in the wire 15. The excess pressure ρ is attained by the application of pressure to the core or simply through the gravitational force of a column of liquid. In this way the anti-buckling device can be used in G-suits (EP 0 983 190) in order to prevent buckling of fluid-filled cores in the hip, knee and elbow joint regions and to guarantee that the height of the liquid column essentially corresponds to the difference in height between pilot's neck and ankles.

FIGS. 15a, b, essentially show the same configuration as FIGS. 14a, b. The anti-buckling device 1 is dimensioned here so that it is not deformed by changes in the cross-section. The width of the cross-section thus approximately corresponds to the diameter D'. This type of configuration can of course also be used in a duct 6 or in a hose 14.

The invention claimed is:

1. An anti-buckling device for insertion into a thin-walled bendable fluid duct, comprising:
   a plurality of ribs extending in a longitudinal direction of the anti-buckling device, the plurality of ribs having a height which varies in a transverse direction, the plurality of ribs having a maximum height near a center of the anti-buckling device, wherein spaces between adjacent ribs form grooves;
   wherein a cross-section of the anti-buckling device fills a cross-section of the duct in such a way that duct walls lie on the plurality of ribs at a buckling point but cannot penetrate into the grooves causing the grooves to remain open and permeable for fluids when the anti-buckling device is bent;
   wherein the fluids circulate through the grooves of the anti-buckling device and, if necessary, transmit pressure forces; and
   wherein an envelope of the anti-buckling device in at least a portion of a length of the anti-buckling device corresponds essentially to the cross-section of the duct at the buckling point.

2. The anti-buckling device according to claim 1, wherein the plurality of ribs in the longitudinal direction are interrupted, and wherein the grooves are connected to each other by way of transverse connections.

3. The anti-buckling device according to claim 2, wherein the plurality of interrupted ribs are formed as knobs, and wherein the grooves with the transverse connections form an intermediate space.

4. The anti-buckling device according to claim 3, wherein the knobs are applied to an inside of the duct wall.

5. The anti-buckling device for thin-walled fluid ducts according to claim 1, wherein the anti-buckling device is formed in such a way that at least one plastic pipe can be inserted in the anti-buckling device.

6. The anti-buckling device according to claim 5, wherein the at least one plastic pipe is reinforced.

7. The anti-buckling device according to claim 1, wherein the envelope is essentially lenticular.

8. The anti-buckling device according to claim 1, wherein the envelope essentially corresponds to the cross-section of the duct along an entire length of the anti-buckling device.

9. The anti-buckling device according to claim 8, wherein the envelope is essentially lenticular in the middle of the anti-buckling device and becomes continuously more circular in both directions.

10. The anti-buckling device according to claim 1, wherein the thin-walled fluid duct is a hose and the anti-buckling device is deformable and is adapted to adjust itself to deformations in a cross-section of the hose.

11. The anti-buckling device according to claim 1, wherein the thin-walled fluid duct is a core worked into a woven material and the anti-buckling device is deformable and is adapted to adjust itself to changes in a cross-section of the core induced by a pressure p.

12. The anti-buckling device according to claim 1, wherein the anti-buckling device consists of an elastic material.

13. The anti-buckling device for thin-walled fluid ducts according to claim 12, wherein the elastic material has a hardness of between 30 and 80 Shore.

14. The anti-buckling device according to claim 13, wherein the elastic material has a hardness of between 30 and 60 Shore.

15. The anti-buckling device according to claim 1, wherein the anti-buckling device consists of an elastomer.

16. The anti-buckling device according to claim 1, wherein the plurality of ribs are applied to an inside of a duct wall.

17. The anti-buckling device according to claim 1, wherein a width of the anti-buckling device is smaller than a corresponding part of the cross-section of the duct at the buckling point and corresponds approximately to a width of the duct remote from the buckling point.

18. An anti-buckling device for insertion into a thin-walled bendable fluid duct, comprising:
- a plurality of ribs extending in a longitudinal direction of the anti-buckling device, wherein spaces between two adjacent ribs form grooves for positioning within the duct;
- a cross-section of the anti-buckling device being adapted to fill a cross-section of the duct in such a way that duct walls lie on the plurality of ribs at a buckling point but cannot penetrate into the grooves causing the grooves to remain open for fluid flow when the anti-buckling device is bent; and
- wherein said two ribs of the plurality of ribs at a center of the anti-buckling device are shaped to accommodate at least one plastic pipe.

19. An anti-buckling device for insertion into a thin-walled bendable fluid duct having an interior, longitudinally extending fluid flow region, the duct having a top inner surface wall area and a bottom inner surface wall area defining a first maximum, internal dimension of the interior fluid flow region when the duct is not bent and a second maximum, internal dimension when the duct is bent, the device comprising:
- a plurality of ribs oriented with and extending longitudinally along the interior fluid flow region of the anti-buckling device, wherein spaces between adjacent ribs form grooves;
- the maximum height of the device being less than the first maximum internal dimension of the duct;
- the maximum height of the device being less than or equal to the second maximum internal dimension of the duct; and
- wherein at said second maximum internal dimension, a cross-section of the anti-buckling device is adapted to fill a cross-section of the duct in such a way that at least one of the top inner surface wall area and the bottom inner surface wall area of the duct engages the plurality of ribs but cannot penetrate into the grooves causing the grooves to remain open and permeable for fluid flow.

20. The anti-buckling device according to claim 19, wherein the plurality of ribs having a height which varies in a transverse direction.

* * * * *

UNITED STATES PATENT AND TRADEMARK OFFICE
CERTIFICATE OF CORRECTION

PATENT NO. : 7,637,287 B2
APPLICATION NO. : 10/543082
DATED : December 29, 2009
INVENTOR(S) : Andreas Reinhard et al.

It is certified that error appears in the above-identified patent and that said Letters Patent is hereby corrected as shown below:

In the Drawings:
    Delete Drawing Sheet 4 of 6, and replace with Drawing Sheet 4 of 6. (attached)

In the Specification:
    At Column 3, Line 51: Replace --a-- with "σ"

Signed and Sealed this

Twenty-third Day of November, 2010

David J. Kappos
*Director of the United States Patent and Trademark Office*